(12) United States Patent
Noya et al.

(10) Patent No.: US 7,516,355 B2
(45) Date of Patent: Apr. 7, 2009

(54) METHOD AND COMPUTER PROGRAM PRODUCT FOR BACKING UP AND RESTORING ONLINE SYSTEM INFORMATION

(75) Inventors: Eric S. Noya, Groton, MA (US); Randy M. Arnott, Mont Vernon, NH (US)

(73) Assignee: Broadcom Corporation, Irvine, CA (US)

( * ) Notice: Subject to any disclaimer, the term of this patent is extended or adjusted under 35 U.S.C. 154(b) by 421 days.

(21) Appl. No.: 10/981,538

(22) Filed: Nov. 5, 2004

(65) Prior Publication Data

US 2006/0112300 A1    May 25, 2006

(51) Int. Cl.
*G06F 11/00* (2006.01)
(52) U.S. Cl. .............................. 714/6; 714/20; 711/114; 711/162; 711/163
(58) Field of Classification Search ........................ None
See application file for complete search history.

(56) References Cited

U.S. PATENT DOCUMENTS

| | | | |
|---|---|---|---|
| 6,175,904 B1 * | 1/2001 | Gunderson | 711/162 |
| 6,324,627 B1 | 11/2001 | Kricheff et al. | |
| 6,901,493 B1 * | 5/2005 | Maffezzoni | 711/162 |
| 7,000,142 B2 * | 2/2006 | McCombs | 714/6 |
| 7,146,525 B2 * | 12/2006 | Han et al. | 714/6 |
| 7,219,257 B1 * | 5/2007 | Mahmoud et al. | 714/6 |
| 2004/0153724 A1 * | 8/2004 | Nicholson et al. | 714/6 |
| 2005/0144406 A1 * | 6/2005 | Chong, Jr. | 711/162 |
| 2005/0246397 A1 * | 11/2005 | Edwards et al. | 707/204 |
| 2006/0020636 A1 * | 1/2006 | Murotani | 707/200 |
| 2007/0150651 A1 * | 6/2007 | Nemiroff et al. | 711/114 |

* cited by examiner

*Primary Examiner*—Christopher S McCarthy
(74) *Attorney, Agent, or Firm*—Sterne, Kessler, Goldstein & Fox, PLLC.

(57) ABSTRACT

A method and system for copying operating system information to said at least two storage devices, selectively hiding at least one, but not all, of the storage devices from being accessed by the operating system, and selectively revealing one or more of said hidden storage devices as needed to permit access to the information stored therein.

14 Claims, 7 Drawing Sheets

METHOD AND COMPUTER PROGRAM PRODUCT FOR BACKING UP AND RESTORING ONLINE SYSTEM INFORMATION

BACKGROUND OF THE INVENTION

1. Field of the Invention

The disclosed invention relates to RAID array controllers, and more particularly to a method and computer program product for backing up and restoring online system information.

2. Background Art

There are many applications, particularly in a business environment, where there are storage needs beyond those that can be fulfilled by a single hard disk, regardless of its size, performance or quality level. Many businesses can't afford to have their systems go down for even an hour in the event of a disk failure. They need large storage subsystems with capacities in the terabytes. And they want to be able to insulate themselves from hardware and software failures to any extent possible. Some people working with multimedia files need fast data transfer exceeding what current drives can deliver, without spending a fortune on specialty drives. These situations require that the traditional "one hard disk per system" model be set aside and a new system employed. This technique is called Redundant Arrays of Inexpensive Disks or RAID. ("Inexpensive" is sometimes replaced with "Independent", but the former term is the one that was used when the term "RAID" was first coined by the researchers at the University of California at Berkeley, who first investigated the use of multiple-drive arrays in 1987. See D. Patterson, G. Gibson, and R. Katz. "A Case for Redundant Array of Inexpensive Disks (RAID)", Proceedings of ACM SIGMOD '88, pages 109--116, June 1988.

The fundamental structure of RAID is the array. An array is a collection of drives that is configured, formatted and managed in a particular way. The number of drives in the array, and the way that data is split between them, is what determines the RAID level, the capacity of the array, and its overall performance and data protection characteristics.

It should be understood that RAID arrays are typically formed by partitioning one or more disks. Each partitioned area on the disk may be referred to as a storage device. One or more storage devices constitutes the RAID array. Mirrored arrays are typically formed on two or more separate and distinct disks.

An array appears to the operating system to be a single logical hard disk. RAID employs the technique of striping, which involves partitioning each drive's storage space into units ranging from a sector (512 bytes) up to several megabytes. The stripes of all the disks are interleaved and addressed in order.

Most modern, mid-range to high-end disk storage systems are arranged as RAID configurations. A number of RAID levels are known. JBOD stands for Just a Bunch of Drives. The controller treats one or more disks or unused space on a disk as a single array. JBOD provides the ability to concatenate storage from various drives regardless of the size of the space on those drives. JBOD is useful in scavenging space on drives unused by other arrays. JBOD does not provide any performance or data redundancy benefits.

RAID 0, or striping, provides the highest performance but no data redundancy. Data in the array is striped (i.e. distributed) across several physical drives. RAID 0 arrays are useful for holding information such as the operating system paging file where performance is extremely important but redundancy is not.

RAID 1, or mirroring, mirrors the data stored in one physical drive to another. RAID 1 is useful when there are only a small number of drives available and data integrity is more important than storage capacity.

RAID 1$n$, or n-way mirroring, mirrors the data stored in one hard drive to several hard drives. This array type will provide superior data redundancy because there will be three or more copies of the data and this type is useful when creating backup copies of an array. This array type is however expensive, in both performance and the amount of disk space necessary to create the array type.

RAID 10 is also known as RAID (0+1) or striped mirror sets. This array type combines mirrors and stripe sets. RAID 10 allows multiple drive failures, up to 1 failure in each mirror that has been striped. This array type offers better performance than a simple mirror because of the extra drives. RAID 10 requires twice the disk space of RAID 0 in order to offer redundancy.

RAID 10$n$ stripes multiple n-way mirror sets. RAID 10$n$ allows multiple drive failures per mirror set, up to n-1 failures in each mirror set that has been striped, where n is the number of drives in each mirror set. This array type is useful in creating exact copies of an array's data using the split command. This array type offers better random read performance than a RAID 10 array, but uses more disk space.

RAID 5, also known as a stripe with parity, stripes data as well as parity across all drives in the array. Parity information is interspersed across the drive array. In the event of a failure, the controller can rebuild the lost data of the failed drive from the other surviving drives. This array type offers exceptional read performance as well as redundancy. In general, write performance is not an issue due to the tendency of operating systems to perform many more reads than writes. This array type requires only one extra disk to offer redundancy. For most systems with four or more disks, this is a desirable array type.

RAID 50 is also known as striped RAID 5 sets. Parity information is interspersed across each RAID 5 set in the array. This array type offers good read performance as well as redundancy. A 6-drive array will provide the user with 2 striped 3-drive RAID 5 sets. Generally, RAID 50 is useful in very large arrays, such as arrays with 10 or more drives.

Thus RAID or Redundant Array of Independent Disks are simply several disks that are grouped together in various organizations to either improve the performance or the reliability of a computer's storage system. These disks are grouped and organized by a RAID controller.

Each conventional RAID controller has a unique way to lay out the disks and store the configuration information. On the other hand, a system controlled by a common Operating System (OS) has a known format. When users try to add a RAID controller to their system, the most important task is to migrate the existing data disks to a RAID controlled system. The common operating system configuration format to control and communicate with a disk in the system is referred to as "metadata". The OS metadata is different from the RAID controller's unique configuration format which is also referred to as "metadata".

In the early days of RAID, fault tolerance was provided through redundancy. However, problems occurred in situations where a drive failed in a system that runs 24 hours a day, 7 days a week or in a system that runs 12 hours a day but had a drive go bad first thing in the morning. The redundancy would let the array continue to function, but in a degraded state. The hard disks were typically installed deep inside the server case. This required the case to be opened to access the failed drive and replace it. In order to change out the failed drive, the other drives in the array would have to be powered off, interrupting all users of the system.

If a drive fails in a RAID array that includes redundancy, it is desirable to replace the drive immediately so the array can be returned to normal operation. There are two reasons for this: fault tolerance and performance. If the drive is running in a degraded mode due to a drive failure, until the drive is replaced, most RAID levels will be running with no fault protection at all. At the same time, the performance of the array will most likely be reduced, sometimes substantially.

An important feature that allows availability to remain high when hardware fails and must be replaced is drive swapping. Strictly speaking, the term "drive swapping" simply refers to changing one drive for another. There are several types of drive swapping available.

"Hot Swap": A true hot swap is defined as one where the failed drive can be replaced while the rest of the system remains completely uninterrupted. This means the system carries on functioning, the bus keeps transferring data, and the hardware change is completely transparent.

"Warm Swap": In a so-called warm swap, the power remains on to the hardware and the operating system continues to function, but all activity must be stopped on the bus to which the device is connected.

"Cold Swap": With a cold swap, the system must be powered off before swapping out the disk drive.

Another approach to dealing with a bad drive is through the use of "hot spares." One or more additional drives are attached to the controller and are not used by I/O operations to the array. If a failure occurs, the controller can use the spare drive as a replacement for the bad drive.

The main advantage that hot sparing has over hot swapping is that with a controller that supports hot sparing, the rebuild will be automatic. The controller detects that a drive has failed, disables the failed drive, and immediately rebuilds the data onto the hot spare. This is an advantage for anyone managing many arrays, or for systems that run unattended.

Hot sparing and hot swapping are independent but not mutually exclusive. They will work together, and often are used in that way. However, sparing is particularly important if the system does not have hot swap (or warm swap) capability. The reason is that sparing will allow the array to get back into normal operating mode quickly, reducing the time that the array must operate while it is vulnerable to a disk failure. At any time either during rebuild to the hot spare or after rebuild, the failed drive can be swapped with a new drive. Following the replacement, the new drive is usually assigned to the original array as a new hot spare.

When a RAID array disk drive goes bad, the system must make changes to the configuration settings to prevent further writes and reads to and from the bad drive. Whenever a configuration change happens, the configuration changes have to be written out to all of the disks in the RAID array.

When the operating system or an application wants to access data on a hard disk before it has loaded native drivers for disk access, it traditionally employs BIOS services to do this. BIOS is the abbreviation for Basic Input/Output System. The BIOS provides basic input and output routines for communicating between the software and the peripherals such as the keyboard, screen and the disk drive. The BIOS is built-in software that determines what a computer can do without accessing programs from a disk. The BIOS generally contains all the code required to control the keyboard, display screen, disk drives, serial communications, and a number of miscellaneous functions. While the access is not necessarily optimal, it is done through an easy to use interface for minimal code can access these devices until the more optimal drivers take over.

The BIOS is typically placed on a ROM (Read Only Memory) chip that comes with the computer (it is often called a ROM BIOS). This ensures that the BIOS will always be available and will not be damaged by disk failures. It also makes it possible for a computer to boot itself.

When users perform complex tasks, they sometimes make mistakes that result in missing RAID arrays or lost data. It is very difficult to find out what happened and recover the missing arrays and data. This can be devastating to a business that has large numbers of records stored in the arrays. It is imperative that there be some way to recover the missing or lost data. Therefore, what is needed is a method and system to easily recover missing arrays and data.

BRIEF SUMMARY OF THE INVENTION

This invention comprises a method for storing and retrieving critical system information from accidental or malicious data loss. By storing first the critical data in a mirrored storage device, and then dividing it into at least two disjoint storage devices and by hiding one of the storage devices from the Operating System or any user of the computer, a copy of the critical system information can be hidden away. When partial or total data loss occurs, the hidden storage device can be used to substitute for the damaged storage device by replacing it with the hidden storage device. The operation can be repeated to create a fresh backup copy of the restored critical information.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings, like reference numbers may indicate identical or functionally similar elements. Additionally, the left-most digit(s) of a reference number may identify the drawing in which the reference number first appears.

DETAILED DESCRIPTION OF THE INVENTION

Figure 1:
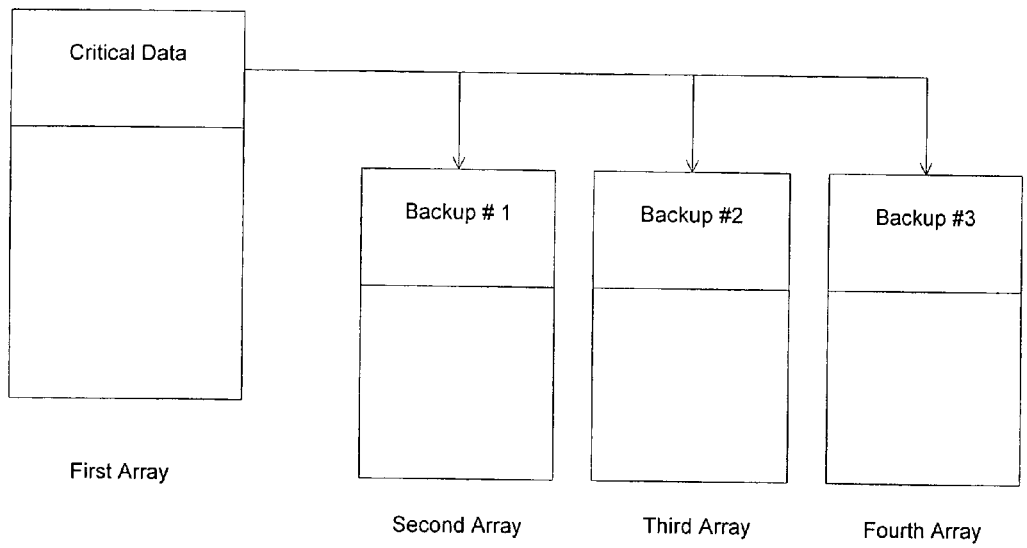
FIG. 1 shows how critical data in a first array can be selectively stored in a plurality of backup arrays.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. This invention will be described in terms of a standard Intel® processor PC system. Those persons skilled in the relevant arts will recognize that this invention can be implemented with other processor PC systems equally as well.

The present invention is primarily directed to a method and system for protecting a computer system using RAID from accidental or malicious data loss. Many organizations have a great need to store large amounts of data accurately. A loss of all or part of that data could be catastrophic to the operation of the organization. This problem can be resolved by storing the critical data in a mirror (RAID 1 or RAID 10) array. The mirror is then split into two arrays (e.g., JBOD or RAID 0) and access to one of the arrays is strictly limited (or hidden). Not even the operating system can access the hidden data. Only the system administrator has access to the key to unlock or unhide the hidden array, in the event access to that array is needed. In this way, a copy of the data can be safely stored and accidental or malicious data loss can be avoided. If a partial or total data loss occurs on the "public" side of the array, due, for example, to disk failures, the hidden copy can be accessed and used to recreate the lost data.

Microsoft Windows XP® has a utility called "system restore" which allows critical data to be backed up and restored. However this utility does not protect the computer when an array (e.g., volume, disk, etc.) is lost. This is because the data in the array is not backed up as part of the critical Windows system data. If the data in the array is not backed up, it cannot be restored as part of the "system restore" process.

A typical RAID controller contains a common function called a "split" command. This command essentially separates a mirrored array such as a RAID level 1 or level 10 array into two (initially identical) arrays. The operating system can then write separately to each of these arrays. One of the arrays can be considered a backup array. Another common function of RAID controllers is the "merge" function. This function permits the two arrays to be reconnected and merged.

The inventors have analyzed these operations and have determined that a deficiency of the conventional "split" and "merge" functions is that they do not address the problem of corrupted data being written to a disk, or the problem of a bad disk. As noted above, when an array is split, both arrays are visible to the Operating System. A malicious user or program can write to both arrays. Obviously, it will not be possible to restore data if both arrays are corrupted.

This issue is resolved by the present invention. In this invention, two additional commands are implemented in the RAID controller. These are called respectively "hide" and "unhide" commands. The "hide" command renders an array effectively invisible to the operating system. Neither software (e.g., a virus) nor a malicious user can write to the hidden array. When the hide command is invoked, the RAID controller does not provide a path allowing anything in the system to write to or read from that array. When the "unhide" command is invoked, the RAID controller opens a path that allows the operating system to access the array and to write to and/or read from that array.

In one example of the present invention, when a "split" command is executed, the default operation also "hides" the split-off mirror copy. It will be apparent to one skilled in the art that, in an alternative arrangement, the default can be changed so that when a "split" command is invoked, the "hide" command will be an option that must also be invoked by the user.

The present invention can also be used with non-mirrored arrays, such as a RAID 5 set or any other non-mirrored array. In this example, the RAID controller contains a "copy and hide" command. Invoking this command will call for a copy to be made of the RAID 5 set. The copy will be hidden from the operating system for backup purposes in the same way as the "split and hide" command is used for mirrored arrays, such as RAID 1 and RAID 10 sets.

The hide and unhide commands are advantageously implemented as part of the RAID controller BIOS function and as part of software running under the operating system. The present invention is operating system independent. For example, this invention can be operated with Linux systems as well as with Microsoft Windows® platforms.

In addition, the present invention can be used to make protected copies of part of an array. FIG. 1 shows how critical data in a first array can be selectively stored in a plurality of backup arrays. Critical data in the first array that requires backup and preservation is copied to the second, third, and/or fourth arrays. The copying can be done automatically if the RAID set is a mirrored array. Alternatively, the backup can be done manually or by means of any other automatic copying technique from the first array. The data that is to be considered "critical data" for this purpose and preserved in a protected area can be defined by the user. Typically the critical data would comprise all the data in the array, If the first and second arrays are mirrored, the user splits the two arrays with a default or manually selected "hide" of the second array. If the arrays are not mirrored, the user manually starts a copy operation from one array to a second hidden array.

If there is sufficient unused disk capacity, a series of backups can be stored by periodically repeating the process. These result in a series of backups, e.g., Backup array #1, Backup array #2, and Backup array #3, for example, run on successive dates. The backup process can be run on a daily, weekly, or any other periodic or a periodic schedule. Upon a hardware failure or contamination of data, the user can unhide one of the backup arrays. It will be apparent to persons skilled in the relevant art(s) that the number of backup arrays is not critical.

One of the features of the present invention is the ability to instantly switch to a backup array in the event of a drive failure or data contamination or corruption. If a drive failure or corruption is detected, the user (e.g., system. administrator) can perform an unhide operation. The (or one of the) backup array(s) will immediately come on line and the corrupted array will be taken off line. The corrupted array can then be removed and replaced. A new backup can be performed and the new backup array then hidden.

The following describes an implementation of the present invention using a RAIDCore RC4×52 RAID Controller, available from RAIDCore, a division of Broadcom Corporation, Nashua, N.H. With the present invention, protection can be obtained from two potential failure mechanisms—ill-behaved software and operators and disk failure.

Protection Against Viruses, Operator Error, and other Software Problems

On a server outfitted with, for example, two 36 GB drives, the RAID controller BIOS utility is used to create a single RAID 1 (mirrored) array that, for reasons discussed below, is, advantageously, slightly less than one-half the size of the full drive space. Approximately one half of the available disk space is used for the mirrored array. It will be apparent to persons skilled in the relevant art that the size of the drives or the mirrored array is not critical; any suitable drive size can be used. It is merely noted that drives from different vendors sometimes vary slightly in size even though they are advertised as being the same size. Because of this, it is useful not to use exactly one half of the available space, in the event a drive must be replaced (due to disk failure). It is helpful to use less than half the available space; alternatively, the replacement drive should advantageously be larger than the drive being replaced for best results. Thus, in the foregoing example, the usable drive space would be on the order of 17 GB.

Figure 2:
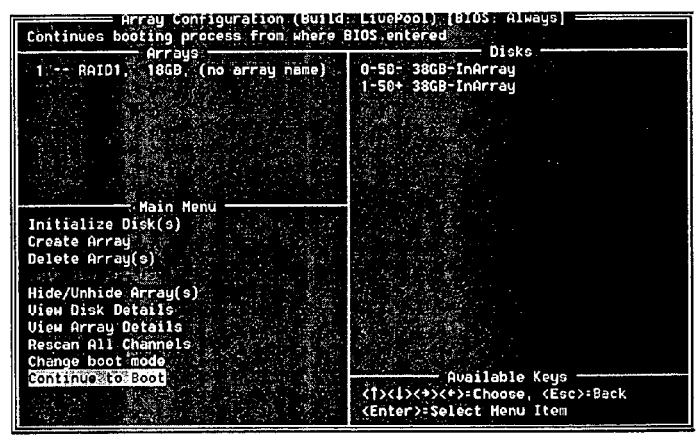
FIG. 2 is a screen shot showing the BIOS utility display of a new RAID 1 array.

At this stage, the RAID controller BIOS utility displays the new array as shown in FIG. 2.

Figure 3:
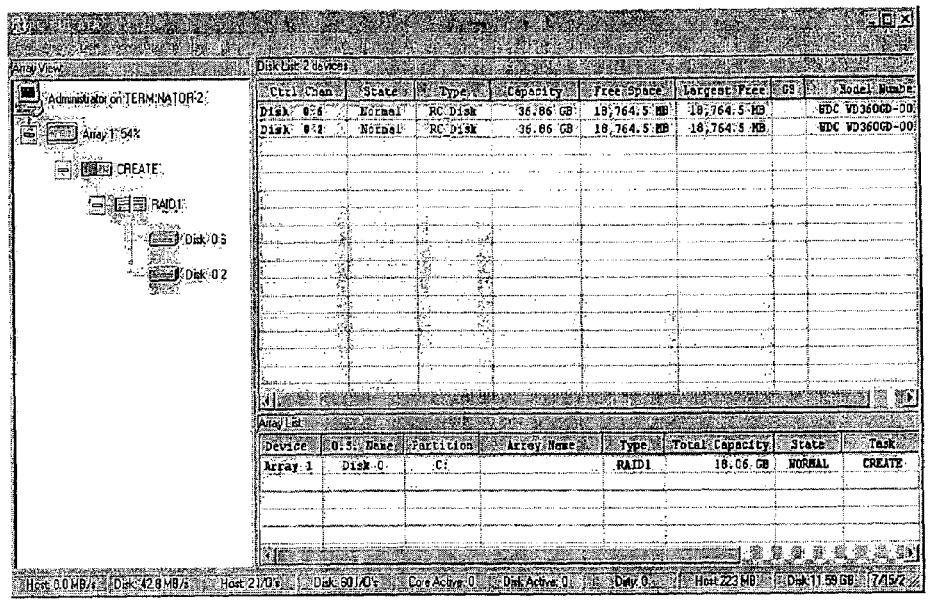
FIG. 3 is a screen shot of the Management Application showing the RAID 1 array being created.
Figure 4:
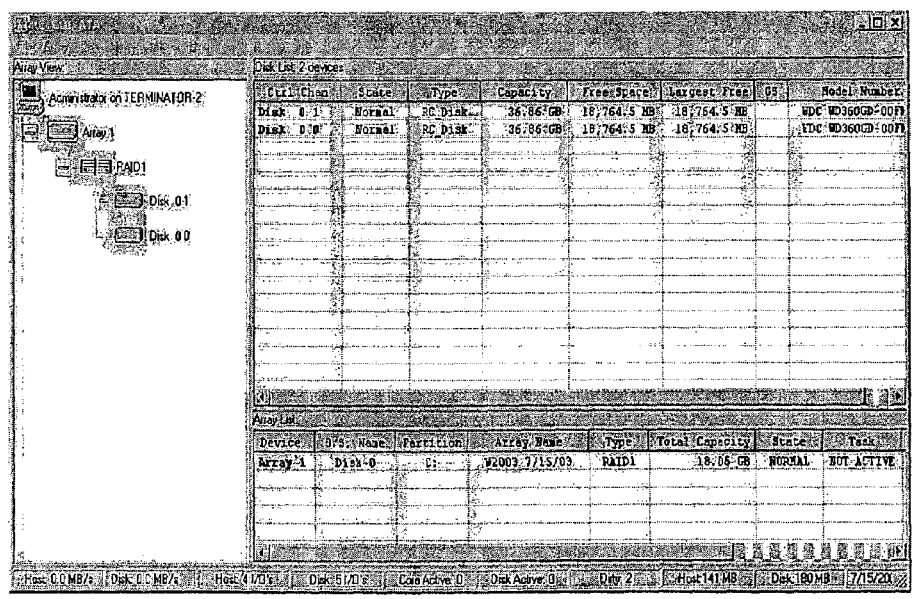
FIG. 4 is a screen shot of the Management Application showing the completed RAID 1 array.

Starting the Management Application, a new RAID 1 array appears as shown in FIG. 3 while it is being created. Once created, the mirrored array appears as shown in FIG. 4. Its capacity is, in this example, 18 GB. To the operating system, it appears as Disk 0 containing partition C, the boot partition. The array has been given a name (e.g., "W2003 7/15/03") that includes the date. The reason for this naming will be discussed below.

At this point, the data will be protected against drive failure. However, it is not yet protected against malicious software (e.g. virus) or operator error. This is accomplished through mirror splitting, which allows the system administrator to work with one half of a mirror independently.

Figure 5:
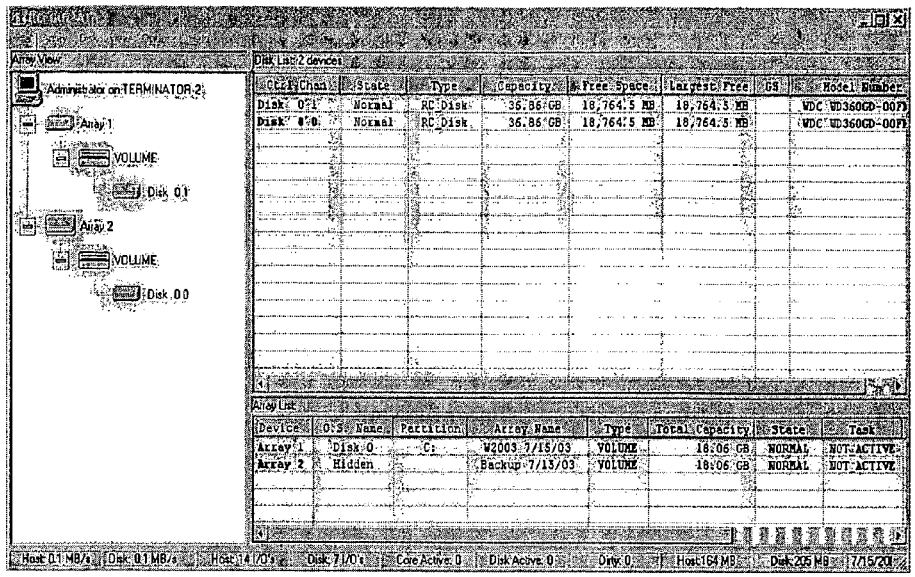
FIG. 5 shows a screen shot of the Management Application showing two volumes of a split array.

Using the Management Application, the mirrored array is split and one of the halves is then hidden. After the split, the arrays become two volumes as shown in FIG. 5.

Under the "O.S. Name" in the Array List, Array 2 is now hidden from the operating system. The array name is changed to add "Backup 7/15/03" to reflect when the split took place. Because the operating system cannot access a hidden array, there is no possibility of accidental or malicious damage to the contents of the hidden array.

Protecting Against Drive Failure

The data on the drives is now protected against ill-behaved software, viruses, and operator error. The data is not yet protected against drive failure. This is because the system disk (Array 1) is a volume. Using Online RAID Level Migration (ORLM), protection against drive failure is established using RAID 1, mirror splitting, and array hiding to create secure backups that are easily recovered.

To protect against drive failure using ORLM and mirror splitting, Array 1 is re-mirrored using a function called a "Transform" function in the RAID controller Management Application. This function enables ORLM by providing the ability to migrate an array of one RAID type to another RAID type while data storage is online and active.

Figure 6:
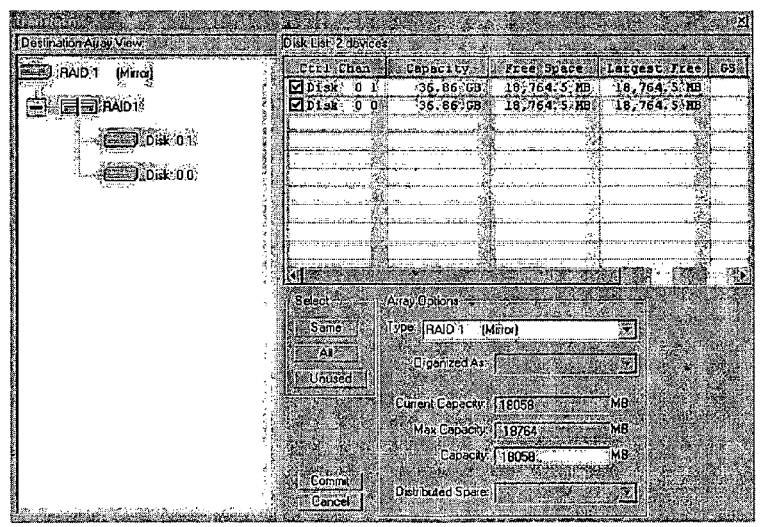
FIG. 6 shows a screen shot of a Transform dialog box showing a RAID 1 destination array.
Figure 7:
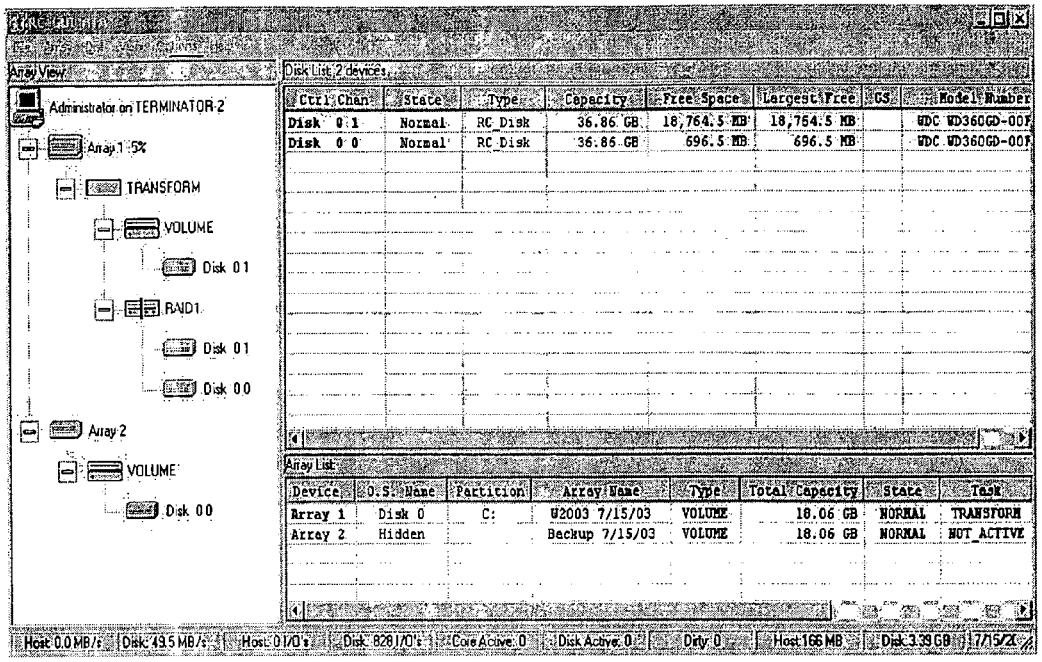
FIG. 7 shows a screen shot of Transform progress displayed in the Management Application.

The Transform function transforms the single drive Volume (C:) to a two-drive RAID 1 array of the same capacity. FIG. 6 shows the resulting Transform dialog box. As the array re-mirrors, the Management Application displays the transform progress as shown in FIG. 7.

After the mirror operation is finished, the data is completely protected.

Periodically, or when significant changes have been made to the system (such as installing new software or hardware), the array should be split and half should be hidden. The unused capacity can be used to mirror the hidden array, to keep an alternative backup of the system, or to store incremental backups of the active system drive. Again, it will be apparent to persons skilled in the relevant arts that the percent of available space used (and resulting unused capacity) is not critical. Any appropriate percentage can be allocated to the backup array.

Figure 8:
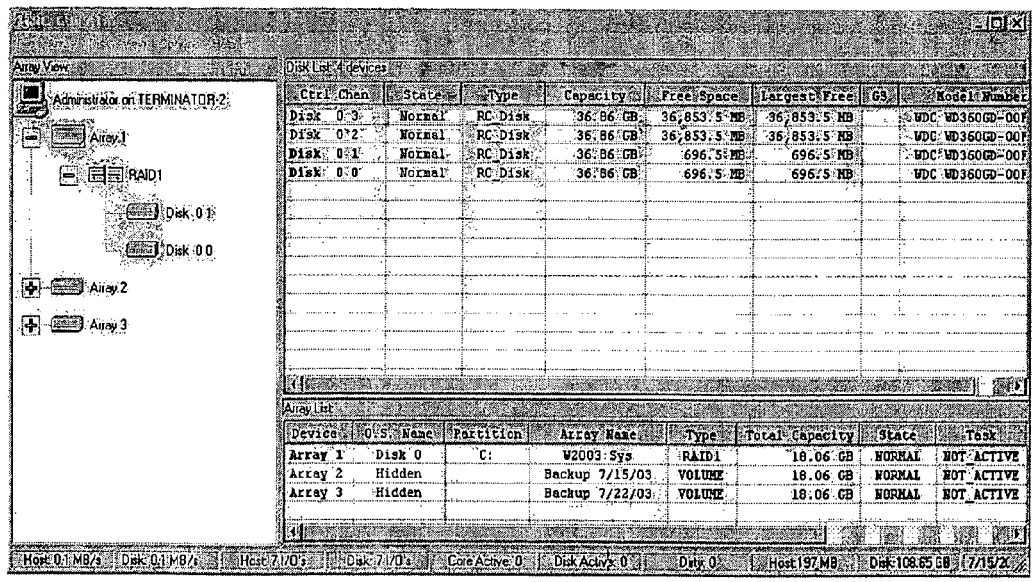
FIG. 8 shows a screen shot of the Management Application showing two backups.
Figure 9:
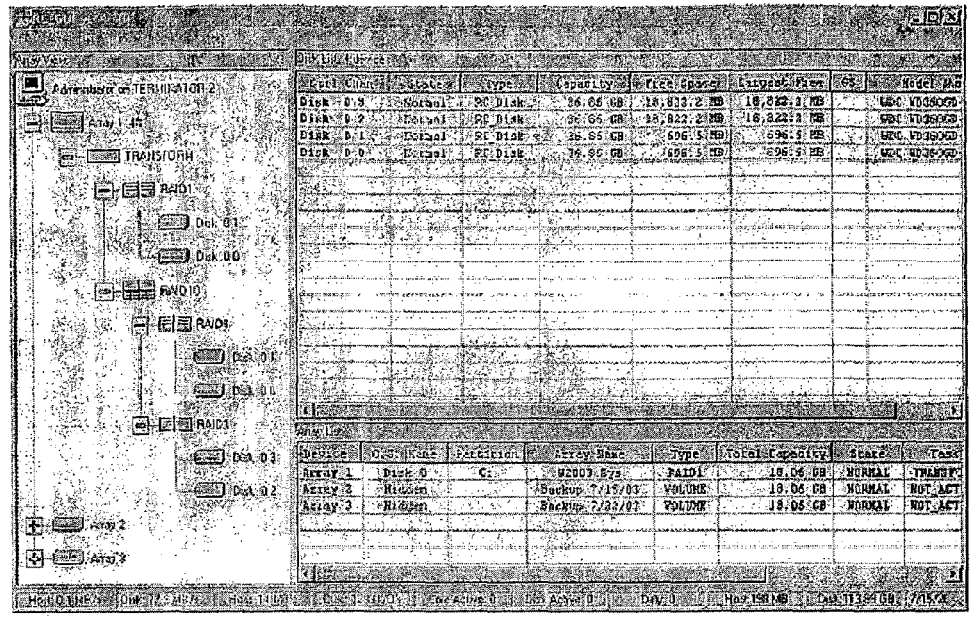
FIG. 9 shows a screen shot of the Management Application showing the transform to a RAID 10 array.
Figure 10:
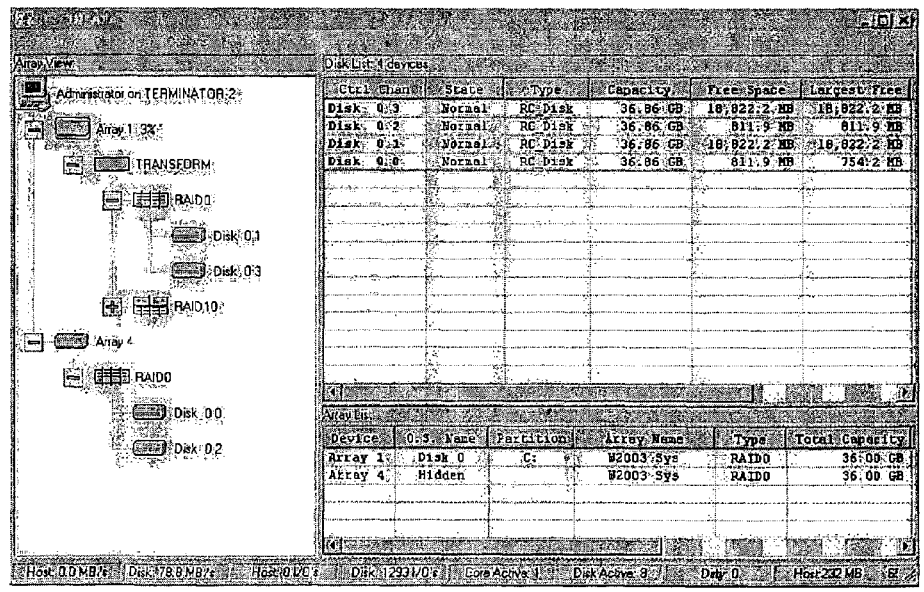
FIG. 10 shows a screen shot of the Management Application showing OCE in progress.
Figure 11:
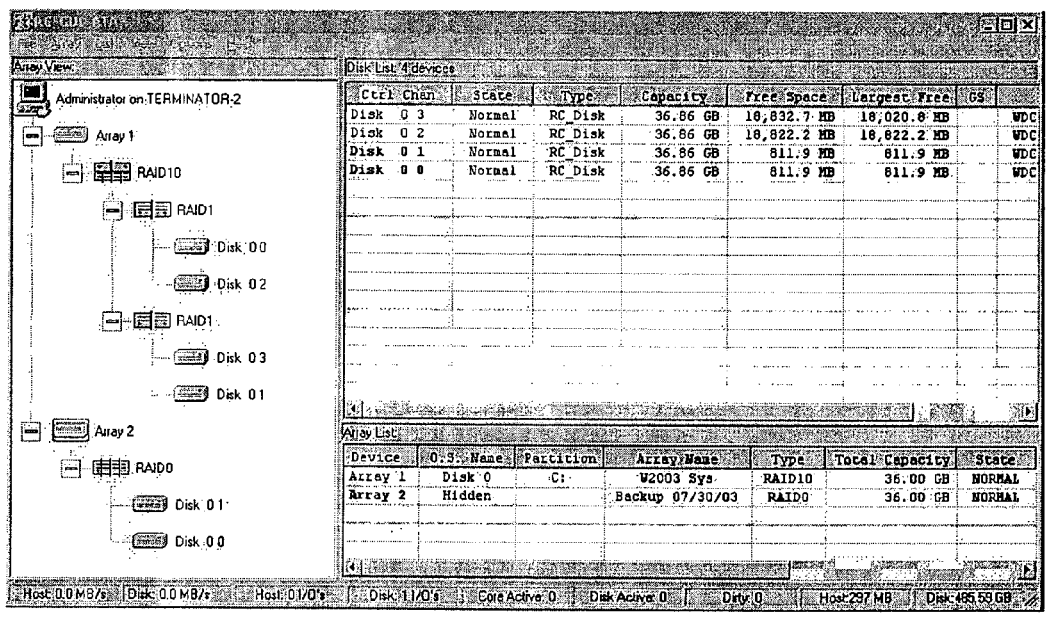
FIG. 11 shows a screen shot of the RAID arrays providing protection from the three storage risks.

Periodically, one of the older backups can be deleted, and the system drive split and re-mirrored. The new backup would then be labeled with the current date. FIG. 8 shows the current system drive and two backups taken on a weekly basis.

Recovering Data after Disk Failure or Data Loss/Corruption

Regardless of whether an entire disk is lost or only some portion of the data is lost or corrupted, returning to a working state as quickly as possible is imperative.

With a hot-swap-capable system, recovery from a disk failure using ORLM and mirror splitting can be accomplished by replacing the failed drive without shutting down the system. After attaching a new drive, the drive must be initialized. The initialization can be done either in the BIOS or with the RAID controller Management Application. Returning the system to its previous state entails re-mirroring the new drive and possibly splitting and re-mirroring again as was done when the system was created, depending on which half of the mirror failed.

Recovering from a corrupted array requires rebooting the machine into the RAID controller BIOS. In the BIOS, the current corrupted array is hidden using the Hide function. The backup hidden array that is to be restored is revealed using the Un-Hide function. This recovers the uncorrupted array and the lost data. After rebooting the system, the corrupted array can be deleted and the current array can be re-mirrored/split/re-mirrored as before. This returns the system to a completely protected state.

In practice, backups can be periodically tested. To test a backup array, the system is shut down, the array(s) to be tested is hidden or revealed, and the backup is booted to verify its integrity. Alternatively, a hidden array can be revealed while the system is operating, a Check Disk (CHKDSK) performed, and then the array is re-hidden.

Figure 12:
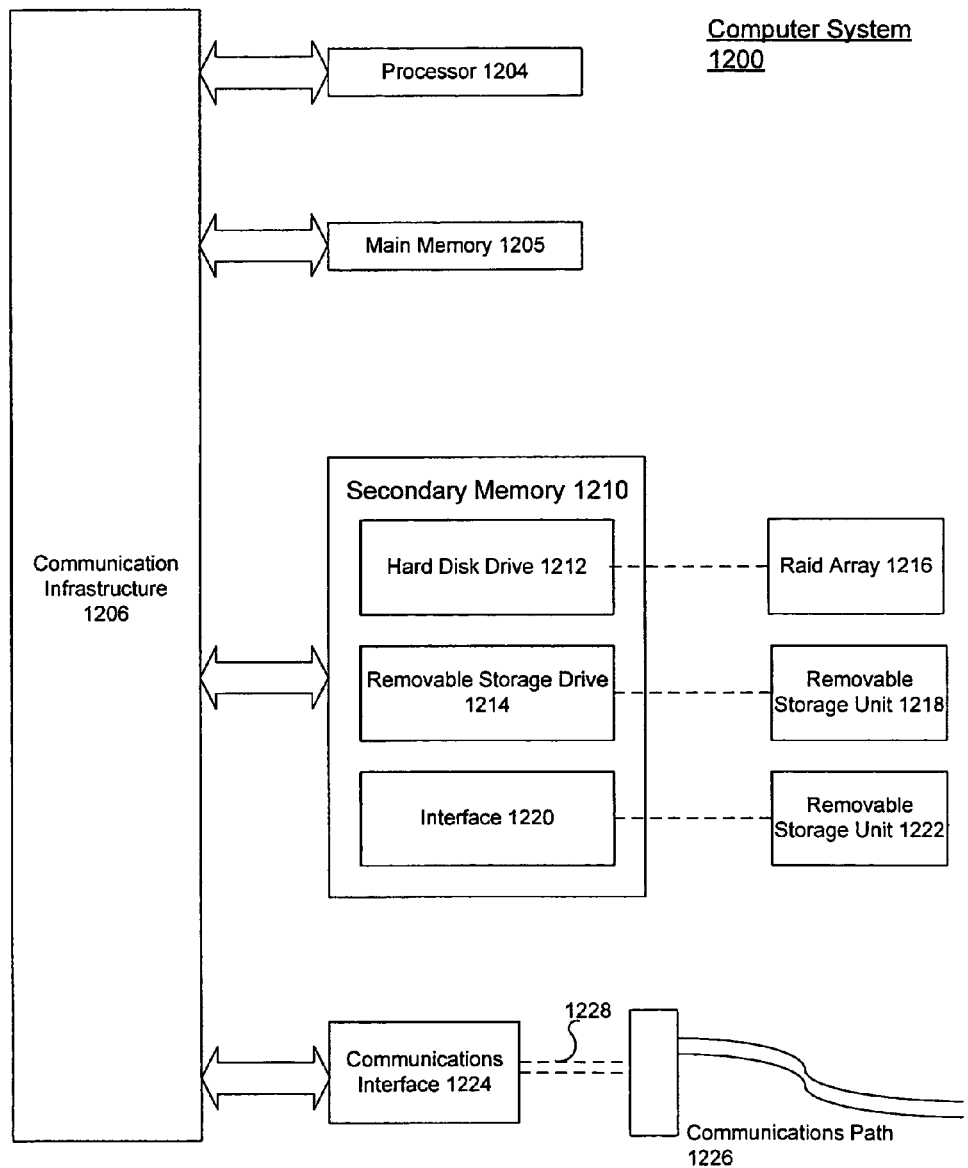
FIG. 12 is a block diagram of a computer system on which the present invention can be implemented.

The following description of a general purpose computer system is provided for completeness. The present invention can be implemented in hardware, or as a combination of software and hardware. Consequently, the invention may be implemented in the environment of a computer system or other processing system. An example of such a computer system 1200 is shown in FIG. 12. The computer system 1200 includes one or more processors, such as processor 1204. Processor 1204 can be a special purpose or a general purpose digital signal processor. The processor 1204 is connected to a communication infrastructure 1206 (for example, a bus or network). Various software implementations are described in terms of this exemplary computer system. After reading this description, it will become apparent to a person skilled in the relevant art how to implement the invention using other computer systems and/or computer architectures.

Computer system 1200 also includes a main memory 1205, preferably random access memory (RAM), and may also include a secondary memory 1210. The secondary memory 1210 may include, for example, a hard disk drive 1212, and/or a RAID array 1216, and/or a removable storage drive 1214, representing a floppy disk drive, a magnetic tape drive, an optical disk drive, etc. The removable storage drive 1214 reads from and/or writes to a removable storage unit 1218 in a well known manner. Removable storage unit 1218, represents a floppy disk, magnetic tape, optical disk, etc. As will be appreciated, the removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Examples of communications interface 1224 may include a modem, a network interface (such as an Ethernet card), a communications port, a PCM-CIA slot and card, etc. Software and data transferred via communications interface 1224 are in the form of signals 1228 which may be electronic, electromagnetic, optical or other signals capable of being received by communications interface 1224. These signals 1228 are provided to communications interface 1224 via a communications path 1226. Communications path 1226 carries signals 1228 and may be implemented using wire or cable, fiber optics, a phone line, a cellular phone link, an RF link and other communications channels.

The terms "computer program medium" and "computer usable medium" are used herein to generally refer to media such as removable storage drive 1214, a hard disk installed in hard disk drive 1212, and signals 1228. These computer program products are means for providing software to computer system 1200.

Computer programs (also called computer control logic) are stored in main memory 1205 and/or secondary memory 1210. Computer programs may also be received via communications interface 1224. Such computer programs, when executed, enable the computer system 1200 to implement the present invention as discussed herein. In particular, the computer programs, when executed, enable the processor 1204 to implement the processes of the present invention. Where the invention is implemented using software, the software may be stored in a computer program product and loaded into computer system 1200 using raid array 1216, removable storage drive 1214, hard drive 1212 or communications interface 1224.

In another embodiment, features of the invention are implemented primarily in hardware using, for example, hardware components such as Application Specific Integrated Circuits (ASICs) and gate arrays. Implementation of a hardware state machine so as to perform the functions described herein will also be apparent to persons skilled in the relevant art(s).

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method of backing up and restoring online system information, comprising:
   (a) copying operating system information to at least two storage devices using a RAID controller device for backing up and restoring the online system information;
   (b) selectively hiding at least one, but not all, of said storage devices from being accessed by the operating system using said RAID controller device, wherein prior to the selective hiding, all the storage devices may operate in an active RAID mode; and
   (c) selectively revealing one or more of said hidden storage devices as needed to permit access to the information stored therein using said RAID controller device.

2. The method of claim 1, wherein said storage devices comprise a RAID array having a plurality of disk storage devices, further comprising:
   (d) copying the contents of one disk in the array to a second disk in the array;
   (e) selectively hiding access to the second disk by the operating system; and
   (f) selectively allowing access to the second disk to read from and/or write to the second disk upon command.

3. The method of claim 1, wherein said storage devices comprise at least one of a mirrored or striped RAID array, further comprising:
   (d) commanding the operating system to write data to and/or read data from each of the arrays; and
   (e) thereafter hiding access to one of the arrays by the operating system to prohibit the operating system from reading from and/or writing to that array.

4. The method of claim 3, further comprising:
   (f) selectively permitting the operating system to access the one array to permit the operating system to thereafter read from and/or write to that array.

5. The method of claim 1, wherein said storage devices comprise a plurality of RAID arrays, each having one or more disk storage devices, further comprising:
   (d) copying data from one RAID array to a second RAID array;
   (e) thereafter hiding access to one of the RAID arrays by the operating system to prohibit the operating system from reading from and/or writing to the one RAID array; and
   (f) selectively permitting the operating system to access the one RAID array to permit the operating system to thereafter read from and/or write to that RAID array.

6. A method of backing up and restoring online system information, comprising:
   (a) writing data to and reading data from one of a plurality of storage devices, wherein said plurality of storage devices are a RAID array;
   (b) copying said data to a second of said storage devices using a RAID controller device for backing up and restoring the online system information; and (c) selectively hiding said second storage device from the operating system to prohibit the operating system from reading from and/or writing to said second storage device using said RAID controller device, wherein prior to the selective hiding, all the storage devices may operate in an active RAID mode.

7. The method of claim 6, further comprising:
(d) selectively allowing the operating system to access said second storage device to thereafter permit the operating system to read from and/or write to said second storage device.

8. A computer program product comprising a tangible computer readable medium having control logic stored therein for causing a computer to backup and restore online system information, the control logic comprising:
   a first computer-executable program tangibly embodied on the computer readable medium for causing the computer to copy online system information to at least two storage devices, wherein said at least two storage devices are a RAID array;
   a second computer-executable program tangibly embodied on the computer readable medium for causing the computer to selectively hide at least one, but not all, of the storage devices containing the copied array from being accessed by the operating system, wherein prior to the selective hiding, all the storage devices may operate in an active RAID mode; and
   a third computer-executable program tangibly embodied on the computer readable medium for causing the computer to selectively reveal one or more of said hidden storage devices as needed to permit access to the information stored therein.

9. The computer program product of claim 8, wherein said RAID array comprises a plurality of disk storage devices, further comprising:
   a fourth computer-executable program tangibly embodied on the computer readable medium for causing the computer to copy the contents of one disk in the array to a second disk in the array;
   a fifth computer-executable program tangibly embodied on the computer readable medium for causing the computer to selectively hide access to the second disk by the operating system; and
   a sixth computer-executable program tangibly embodied on the computer readable medium for causing the computer to selectively allow access to the second disk to read from and/or write to the second disk upon command.

10. The computer program product of claim 8, wherein said RAID array comprises a mirrored RAID array, further comprising:
    a fourth computer-executable program tangibly embodied on the computer readable medium for causing the computer to command the operating system to write data to and/or read data from each of the arrays; and
    a fifth computer-executable program tangibly embodied on the computer readable medium for causing the computer to hide access to one of the arrays by the operating system to prohibit the operating system from reading from and/or writing to that array.

11. The computer program product of claim 10, further comprising:
    a sixth computer-executable program tangibly embodied on the computer readable medium for causing the computer to selectively permit the operating system to access the one array to permit the operating system to thereafter read from and/or write to that array.

12. The computer program product of claim 8, wherein said RAID array comprises a plurality of RAID arrays, each having one or more disk storage devices, further comprising:
    a fourth computer-executable program tangibly embodied on the computer readable medium for causing the computer to copy data from one RAID array to a second RAID array;
    a fifth computer-executable program tangibly embodied on the computer readable medium for causing the computer to command the operating system to hide access to one of the RAID arrays by the operating system to prohibit the operating system from reading from and/or writing to the one RAID array; and
    a sixth computer-executable program tangibly embodied on the computer readable medium for causing the computer to selectively permit the operating system to access the one RAID array to permit the operating system to thereafter read from and/or write to that RAID array.

13. A computer program product comprising a tangible computer readable medium having control logic stored therein for causing a computer to backup and restore online system information, comprising:
    a first computer-executable program tangibly embodied on the computer readable medium for causing the computer to write data to and read data from one of said storage devices, wherein said at least two storage devices are a RAID array;
    a second computer-executable program tangibly embodied on the computer readable medium for causing the computer to copy said data to a second of said storage devices; and
    a third computer-executable program tangibly embodied on the computer readable medium for causing the computer to selectively hide said second storage device from the operating system to prohibit the operating system from reading from and/or writing to said second storage device, wherein prior to the selective hiding, all the storage devices may operate in an active RAID mode.

14. The computer program product of claim 13, further comprising:
    a fourth computer-executable program tangibly embodied on the computer readable medium for causing the computer to selectively allow the operating system to access said second storage device to thereafter permit the operating system to read from and/or write to said second storage device.

\* \* \* \* \*